FIG. I
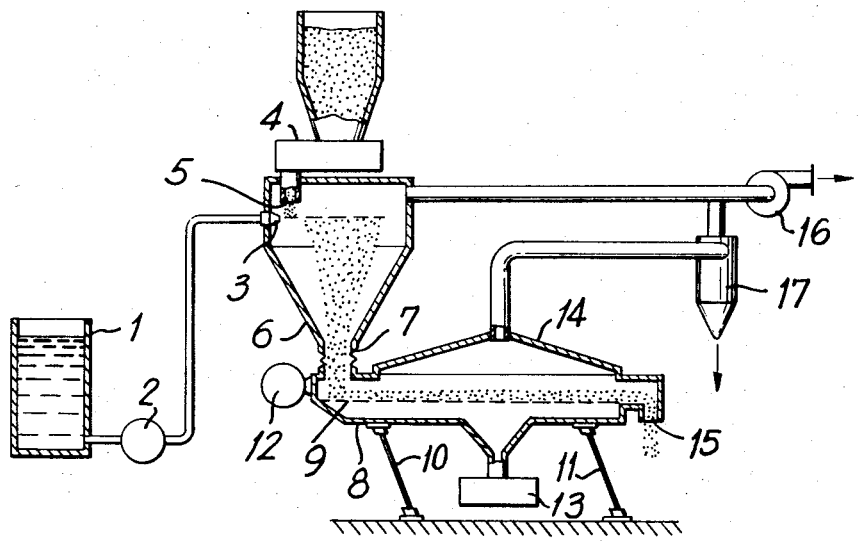
FIG. 2
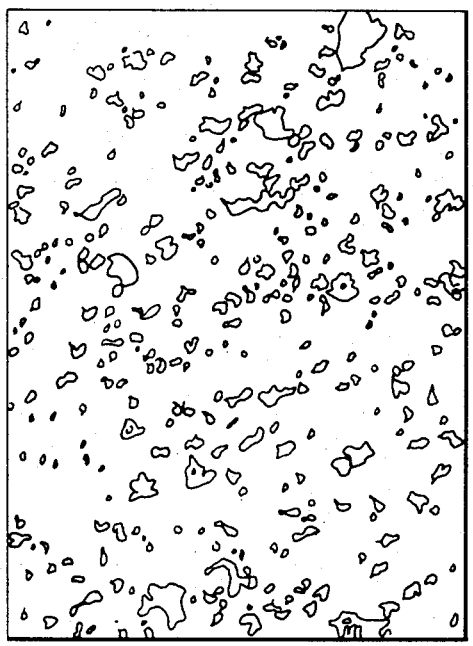
FIG. 3
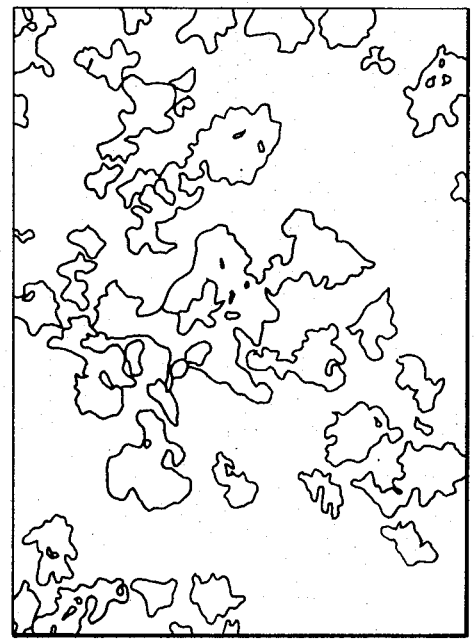
0  1  2  3  4  5  6  7  8  9  10  11  12  mm

United States Patent Office 3,549,336
Patented Dec. 22, 1970

3,549,336
AGGLOMERATING PULVERULENT MATERIAL BY CONTACTING WITH A FILM OF JETTED LIQUID
Théodore Hodel, La Tour-de-Peilz, Switzerland, assignor to Société d'Assistance Technique pour Produits Nestlé S.A.
Filed Nov. 29, 1966, Ser. No. 598,881
Claims priority, application Switzerland, Dec. 7, 1965, 16,852/65
Int. Cl. B01j 1/02; C05b 19/00
U.S. Cl. 23—313
6 Claims

ABSTRACT OF THE DISCLOSURE

Pulverulent products are agglomerated by passing therethrough a jetted thin film of liquid at an angle no greater than 90° for a short period of time, the speed of the jetted film being 8 to 30 meters per second at a temperature between 5° C. and 26° C. collecting and drying the pulverulent material in the form of agglomerated particles.

---

This invention relates to a process for the agglomeration of pulverulent products and an installation for carrying out this process. More particularly, the invention relates to the agglomeration of foodstuffs and dietetic products with a view to improving thier miscibility or dispersibility.

PRIOR STATE OF THE ART

There are various processes for improving the miscibility of pulverulent products. Miscibility is a property of particular value in the case of foodstuffs and dietetic products.

To improve miscibility, the particles have to be increased in size and given a porous structure. One of the most common methods of improving miscibility is to agglomerate the particles of the product. In one known process, particles of the product, in the form of a dry powder, are dispersed for example in a jet of steam so that after they have been moistened, the particles tend to adhere to one another, resulting in the formation of agglomerates.

In the processes for the production of pulverulent products by drying a liquid in a drying tower, it is also possible to dry only part of the product during manufacture so that the particles leaving the drying tower remain hot and moist enough to agglomerate.

One feature common to these processes is that the products are made pasty by the heat to which they are subjected during the agglomeration operations, with the result that even a slight excess of moisture is sufficient to make them completely sticky. The product obtained is therefore unstable and shows a tendency to stick to the walls of the apparatus which can have extremely undesirable consequences.

In the case of powdered milk, for example, the heat initiates crystallisation of the lactose. Unfortunately, such crystallisation reduces the solubility of the powder, thwarting all the efforts made to improve its miscibility by agglomeration.

So far, however, these disadvantages have been accepted as an inevitable concomitant of the desired result.

SUMMARY OF THE INVENTION

In the process according to the invention, moistening takes place in the absence of heat which avoids the aforementioned disadvantages. The process according to the invention utilises the adherence forces arising out of the surface tension of a very thin film of liquid after moistening, and capillary forces after drying, excluding those which would be generated if the product were pasty.

The present invention provides a process for the agglomeration of pulverulent products, especially foodstuffs and dietetic products, wherein the particles of powder are brought into contact with at least one jet of liquid with an initial velocity of at least 8 metres per second and a temperature of at most 30° C. the product is moistened and carried along by the aforementioned jet so that the particles are agglomerated, and the product is collected and dried in the form of a powder of agglomerated particles.

The invention also relates to an installation for carrying out the process defined above and to the product obtained by this process.

The apparatus comprises an enclosure, at least one nozzle and means adapted to project into the aforementioned enclosure a jet of liquid with an initial velocity of at least eight metres per second and a temperature of at most 30° C. a means for regularly distributing the particles of powder and bringing them into contact with the aforementioned jet of liquid and a means for drying the agglomerated product.

One embodiment of each of the two subjects of the invention is shown by way of example in the accompanying drawings, wherein:

FIG. 1 is a diagrammatic longitudinal section through an installation for carrying out the process according to the invention.

FIG. 2 is an enlarged view of the agglomerates obtained by a conventional process.

FIG. 3 is a view on the same scale of the agglomerates obtained by the process according to the invention.

In the installation shown in FIG. 1, the pulverulent product is accommodated in a vibrating feed assembly 4 of conventional design. At its outlet end, this assembly comprises a coarse screen 5 to ensure that the product is uniformly distributed over the entire cross-section of the outlet.

The installation further comprises a hopper 6 into which the outlet of the feed assembly 4 and a nozzle 3 both open. The nozzle 3 is connected by a pipe to a pump 2 which is in turn connected to a tank 1 containing the moistening liquid whose temperature is no more than 30° C. The pressure of the pump is such that the initial velocity of the jet of liquid issuing from the nozzle is at least 8 metres per second. The nozzle is preferably designed in such a way as to produce a flat jet. This result is obtained by means of a nozzle with a circular orifice of limited cross-section opening into a slot approximately equal in width to the diameter of the orifice.

In the embodiment illustrated, the jet is placed in a substantially horizontal plane. According to a modification of the process, the jet could be inclined obliquely upwards. The outlet 7 of the hopper 6 opens into a continuous, fluidised-bed drying assembly 8 of conventional type. This assembly comprises a leakproof housing carrying a screen 9 supported by springs 10 and 11, and a vibration generator 12, such as a motor whose shaft carries an unbalanced flywheel imparting a reciprocating movement to the housing, a heater 13 for heating the air which passes upwards through the screen 9, a collector 14 for removing damp air and an exhaust fan 16. A separator 17 is connected between the collector 14 and the fan 16. The fan 16 is also connected to the hopper 6.

The installation operates as follows:

The pulverulent product falls continuously through the screen 5 into the hopper 6 whilst a pump 2 sucks the liquid stored in the tank 1 and delivers it through the nozzle 3. A flat jet which, initially, is in the form of a fan and then assumes a constant width, issues from the nozzle 3 in a substantially horizontal plane. By virtue of its relatively high speed, this jet acts as a moving support which at its surface carries along the particles of product distributed over it by the feed assembly. The particles are moistened entirely superficially in a very short time ranging from a fraction of a second to at most a few seconds, and tend to adhere to one another to form agglomerates which then fall to the bottom of the hopper 6.

It is important to regulate the rate of flow of the moistening liquid in dependence upon the rate of feed of the pulverulent product, so that all the liquid is absorbed by the particles. Since on the other hand, the temperature of the liquid is considerably lower than the saturation point and since the fan 16 removes any moisture which may be formed in the hopper 6, the particles are never in a damp atmosphere, which is not the case with conventional processes.

The moistened agglomerates pass through the outlet 7 of the hopper into the drying assembly 8 where they are kept in suspension on the screen by the current of hot air delivered by the heater 13, whilst the vibrations imparted to the screen by the generator 12 cause the agglomerates to move towards the outlet 15.

The moisture-laden air removed from the agglomerates is exhausted by the fan 16 and, as it passes through a separator 7; is freed from any fine particles of product carried along by the stream of air. These particles can be returned to the feed assembly 4 for recycling.

Experience has shown that the agglomerates obtained by means of the process according to the invention are larger and show better miscibility of dispersibility than those obtained by conventional processes.

FIG. 2 shows on an enlarged scale agglomerates of particles of a milk powder obtained by means of a conventional agglomeration process using steam. In comparison, agglomerates of the same powder obtained by the process according to the invention, as shown on the same scale in FIG. 3, are clearly larger. In addition, they have a highly branched structure, another factor promoting miscibility. Finally, experience has shown that the agglomerates obtained by the process according to the invention are mechanically more resistant than those obtained by conventional processes. This greater degree of resistance is of advantage because the agglomerated product is in danger of being fragmented during transport and handling and even during drying.

It is evident that various modifications are possible without departing from the scope of the invention. By way of example, the nozzle producing the fan-like jet could be replaced by a series of nozzles arranged in a row producing a number of substantially parallel jets whose initial velocity is sufficient to form a liquid sheet of adequate width.

The liquid can be water. In a modified embodiment of the invention, it may contain, to some extent at least, substances included in the composition of the pulverulent product, for example milk where the particles to be agglomerated are those of a milk powder. It may also comprise an aqueous solution or dispersion of the product.

Application of the process according to the invention has particular advantages in the production of foodstffs and dietetic products for example, milk powders, chocolate-flavoured beverages and soups, by virtue of the low temperature at which agglomeration takes place. It is obvious, however, that the process could be applied to the agglomeration of particles of pulverulent products other than foodstuffs, for example pharmaceuticals.

The process according to the invention is illustrated by the following example, although it is in no way limited to the conditions described therein.

EXAMPLE

The tank is filled with a dispersion of 10% by weight of skim milk powder in water, which has been boiled and cooled to 6° C. The liquid is sucked and delivered through a nozzle by means of a screw pump whose delivery rate is 6 kg./h. at a pressure of 20 kg./cm.$^2$. This nozzle, marketed by Messrs. Spraying Systems Co., Bellwood, Ill., No. T 350011, has an orifice 0.23 mm. in diameter, and projects a flat jet with an initial velocity of at least 8 metres per second. At the mouth of the nozzle, this jet is in the form of a fan with an opening angle of 40°. Some 35 cm. away from the nozzle, it assumes a constant width of approximately 25 cm. over a distance of approximately 1.20 metres. Particles of a skim milk powder delivered by the feed unit at a rate 45 to 65 kg./h., are dispersed over this jet at a suitable distance from the mouth of the nozzle. The agglomerates produced fall to the bottom of the hopper. They contain some 10 to 15% by weight of water. After drying in a current of air heated to 90° C., the moisture content of the agglomerated powder is reduced to 3% by weight its specific gravity being approximately 0.3 g./cm.$^3$.

I claim:

1. A process for agglomerating pulverulent material which comprises contacting a falling stream of particles of said material with a continuous substantially horizontal thin film of jetted liquid whereby the particles are superficially moistened, caused to adhere to one another by the surface tension of the liquid and are carried along the path of the jetted liquid, said jetted liquid being applied at an initial speed between 8 meters per second and 30 meters per second and at a temperature of between 5° C. and 26° C., allowing the agglomerated pulverulent material to fall from the path of the jetted liquid film, and collecting and drying said agglomerated pulverulent material.

2. A process in accordance with claim 1 wherein the jet of liquid contacting the pulverulent material is discharged from a fan-shaped jet to form a substantially flat film acting on the pulverulent material for not more than a few seconds.

3. A process as claimed in claim 1 wherein the temperature of the drying air is not more than 100° C.

4. A process as claimed in claim 1 wherein the liquid is water.

5. A process as claimed in claim 1, wherein the liquid contains to some extent at least substances included in the composition of the pulverulent product.

6. A process as claimed in claim 1, wherein the liquid is in the form of an aqueous solution or dispersion of the pulverulent product.

References Cited

UNITED STATES PATENTS

| | | | |
|---|---|---|---|
| 2,900,256 | 8/1959 | Scott | 99—56 |
| 2,977,203 | 3/1961 | Sienkiewicz | 23—313 |
| 3,042,526 | 7/1962 | Spiess | 99—56 |
| 3,083,099 | 3/1963 | Swanson | 99—56 |
| 3,085,492 | 4/1963 | Peebles | 99—234 |
| 3,120,438 | 2/1964 | McIntire | 99—207X |
| 3,331,306 | 7/1967 | Hutton | 99—234 |
| 3,143,428 | 8/1964 | Reimers | 23—313X |

FOREIGN PATENTS

| | | | |
|---|---|---|---|
| 591,010 | 1/1960 | Canada | 99—56 |
| 686,779 | 11/1953 | Great Bitain | 23—313 |
| 1,403,677 | 5/1965 | France | 99—56 |

NORMAN YUDKOFF, Primary Examiner

S. J. EMERY, Assistant Examiner

U.S. Cl. X.R.

264—117; 99—1, 56, 23.4